INVENTORS
MAKOTO OKUDA
AKIRA FUJISHIMA
BY *Nathan N. Kraus*
Attorneys, *Frank H. Marks*

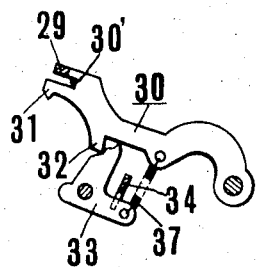
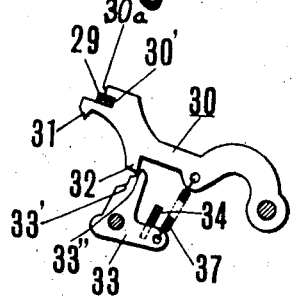
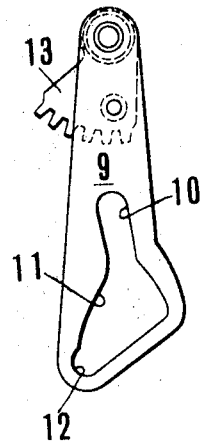
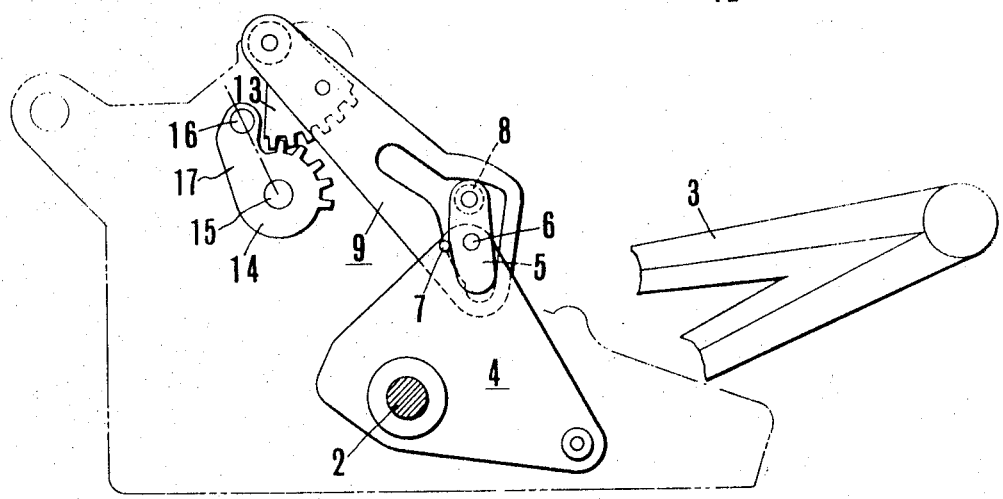

United States Patent Office 3,468,480
Patented Sept. 23, 1969

3,468,480
CALCULATING MACHINE
Makoto Okuda, Osaka, and Akira Fujishima, Nara, Japan, assignors to Maruzen Sewing Machine Co. Ltd., Osaka, Japan
Filed Feb. 16, 1967, Ser. No. 616,525
Int. Cl. G06c 7/10
U.S. Cl. 235—137         5 Claims

ABSTRACT OF THE DISCLOSURE

Means in a calculating machine controlling the movement of the restoring bail rod during the initial portion of an operating cycle so that the type segments and sector gears are permitted to move a sufficient distance to effect resetting of the transfer pawls to normal position.

Our invention relates to calculating machines and more particularly to improved means for automatically resetting the accumulator tens transfer mechanism to normal position during the initial portion of an operating cycle.

BACKGROUND OF THE INVENTION

The present invention constitutes an improvement over Patent No. 2,635,812 which discloses means for restoring the accumulator tens transfer mechanism to normal position during the initial portion of an operating cycle, such means including a pivoted plate member adapted to engage a projection on each of the gear sectors which have been operated to effect a tens transfer, and mechanism including a wipe pawl for actuating said plate member.

SUMMARY OF THE INVENTION

According to the present invention, the pivoted plate member and actuating mechanism therefor are eliminated with novel means being provided in association with the restoring bail rod to accomplish the function of restoring the accumulator tens transfer mechanism to normal position during the initial portion of an operating cycle.

The present invention has for its object the provision, in a calculating machine, of simplified means which is positively operable and trouble free for restoring the accumulator tens transfer mechanism to normal position.

Other and further objects and advantages of our invention will become apparent from the following description when the same is considered in connection with the accompanying drawings.

DESCRIPTION OF THE DRAWINGS

FIG. 4 is a fragmentary elevation of view, partly in cross-section and on an enlarged scale, of certain structural details illustrated in FIGS. 1 to 3.

FIG. 5 is a view similar to FIG. 4 but showing the parts in a different operative relationship.

FIG. 8 is a view similar to FIG. 6 but showing the relationship assumed by the parts at the end of the forward stroke of the operating lever.

FIG. 9 is an elevational view of a structural detail illustrated in FIG. 8.

DESCRIPTION OF THE PREFERRED EMBODIMENTS

Figure 1:
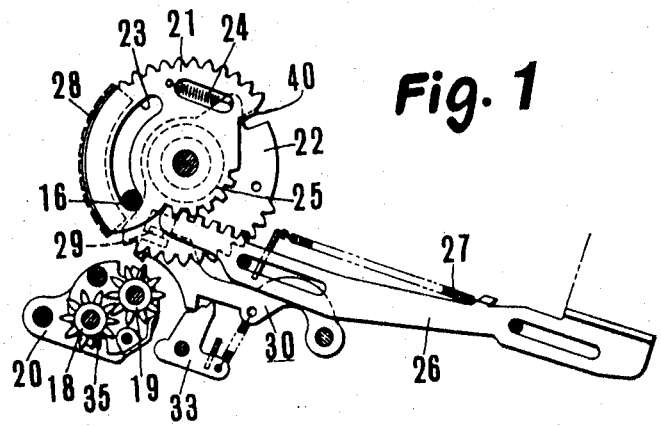
FIG. 1 is a fragmentary longitudinal cross-sectional view illustrating the accumulator tens transfer mechanism of a conventional calculating machine.

In order to simplify the description of the present invention only those parts of the calculating machine which are deemed necessary for a complete understanding of the present invention are illustrated in the drawings. It will be understood that the calculating machine generally in which the present invention is embodied is of a conventional type, such as illustrated and described in Patent No. 2,635,812.

Referring particularly to FIGS. 1 to 9, the numeral 1 indicates one of a pair of vertically disposed parallel frame members in which is journalled a main operating shaft 2 to one end of which is fixed an operating lever 3 disposed exteriorally of the housing of the machine. An operating plate 4 is fixed on the shaft 2 and pivotally supports an arm 5 on pin 6. The arm 5 carries a roller 8 which cooperates with the camming surfaces 10, 11 and 12 formed in a cut-out in the rock arm 9. A pin 7 fixed on the plate 4 functions as a stop to limit the movement of the arm 5 in either direction of rotation.

The rock arm 9 is pivoted at its upper end on the frame members 1 and a segmental gear 13 is fixed to the rock arm 9, the teeth of said gear being in meshing engagement with the teeth of a segmental pinion 14 fixed on shaft 15. The pinion 14 includes an integral arm 17 on the distal end of which is carried one end of a restoring bail rod 16. The shaft 15 extends transversely of the machine and supports at its opposite end an arm, not shown, which supports at its distal end the opposite end of the bail rod 16. Thus, rotation of the segmental gear 14 effects revolution of the bail rod 16 in an arc, the center of which is the axis of shaft 15. The bail rod extends through arcuate slots 23 formed in each of a plurality of type segments 21 mounted for rotation on a shaft co-axial with shaft 15. Adjacent each of the type segments 21 there is provided a co-axially mounted sector gear 22, the teeth of which are adapted to mesh with the subtract and accumulator pinions 18 and 19 respectively. Said pinions are rotatably supported on a rockable frame 20 which is arranged to selectively position either the subtract or accumulator pinions 18 and 19 respectively into engagement with the sector gears 22. Each of said pinions is provided with a conventional transfer cam tooth 35. Each of the type segments 21 is connected to its associated sector gear 22 by a tension spring 24. The extent of relative movement between the two parts is limited by the engagement of a laterally extending lug 40 on the type segment 21 with a confronting edge of the sector gear 22. Each type segment 21 carries a row of type 28 bearing type characters from 0 to 9 and also includes a segmental pinion 25 which is adapted to mesh with a gear rack portion on the rearward end of an actuator 26 which is supported for longitudinal movement on a pair of rods which extend through all of the actuators 26. Each of the actuators 26 is provided with a spring 27 for drawing the actuator rearwardly after the actuator has been released for movement. It will be understood that there is an actuator for each denominational order of the numeral keys, not shown.

The type segments 21 are caused to be moved by the bail rod 16 so that the arcuate slots 23 are in registering alignment. It will be apparent that each spring 27 normally tends to rock its respective type segment 21 in a clockwise direction, as viewed in FIG. 1, and to urge the lower end of the arcuate slot 23 into engagement with the bail rod 16. Accordingly, as the bail rod is caused to revolve clockwise in an arc about the axis of shaft 15 the type segments 21 will be caused to follow to the point where the lower ends of the respective arcuate slots 23 engage the bail rod 16. Correspondingly, when the bail rod 16 is caused to be revolved in a counter-clockwise direction the bail rod will engage the lower ends of slots 23 and will effect rotation of the type segments 21 in a counter-clockwise direction.

A plurality of transfer pawls 30, one for each of the sector gears 22 are pivotally supported at one end on the frame member 1. The distal end of each transfer pawl 30 includes a tooth 31 for engagement with its associated transfer cam tooth 35, a notch 30' and an abutment shoulder 30a for engagement with a sidewardly extending lug 29 formed on the sector gear 22. A pivoted latch 33 cooperates with each of the transfer pawls 30, the latch and pawl being biased into mutual engagement by a spring 37. The latch 33 is adapted to be tripped by a comb plate 34 which is raised when the subtract or accumulator pinions 18 or 19 respectively are in mesh with the gear sectors 22. Referring to FIGS. 4 and 5 it will be seen that the latch 33 is provided with a pair of V notches 33' and 33" adapted to engage a projection tooth 32 on the transfer pawl 30. Referring to FIG. 4, when the tooth 32 is in engagement with the V notch 33' the lug 29 is in engagement with shoulder 30a and the type segment 21 and sector gear 22 are in the relationship illustrated in FIG. 1. When the comb plate 34 is elevated latch 33 is urged by the spring 37 to rock in a counter-clockwise direction, whereupon the tooth 32 is moved into engagement with the V groove 33" thereby effecting a tripping of the transfer pawl 30 so as to permit the spring 24 to rotate the sector gear 22 counter-clockwise, as viewed in FIG. 1, a distance sufficient to cause its associated pinion 19 to be rotated through one-tenth of a revolution, thereby to effect the transfer or carryover. In such position the lug 29 enters into the recess 30' to hold the transfer pawl 30 in tripped position as illustrated in FIG. 5. As the accumulator pinions 19 are returned to normal position, the comb 34 returns the latches 33 to normal position. The pawls 30 then are permitted to return to normal position during the initial portion of the following cycle of operation, as will be presently explained.

Figure 6:
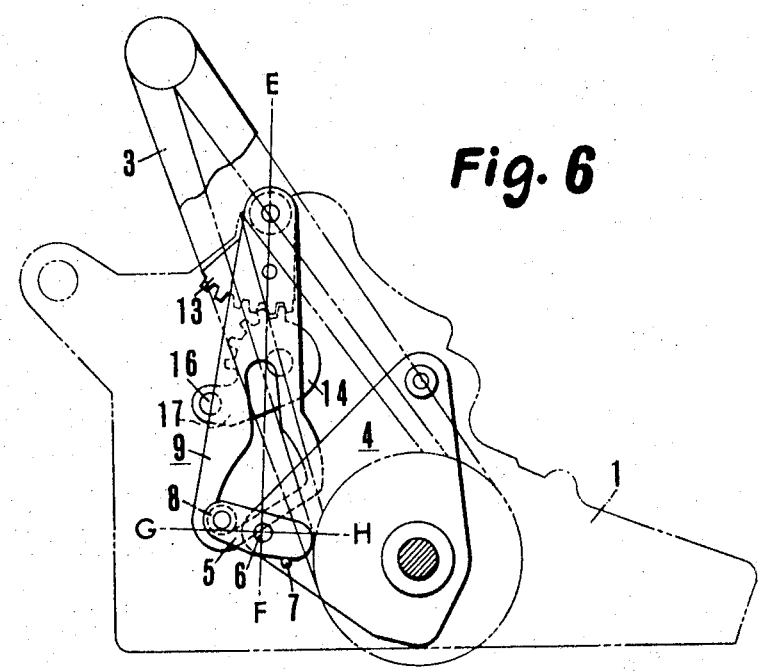
FIG. 6 is a side elevational view, partly in cross-section, illustrating the mechanism which operates to reset the accumulator tens transfer mechanism to normal position.

FIG. 6 illustrates the at rest position of the parts and in such position the center of pin 6 is disposed on a vertical line E–F passing through the pivotal axis of the arm 9. Additionally, the center of roller 8 is disposed above a horizontal line G–H passing through the center of pin 6 and intersecting the line E–F at a right angle.

Figure 7:
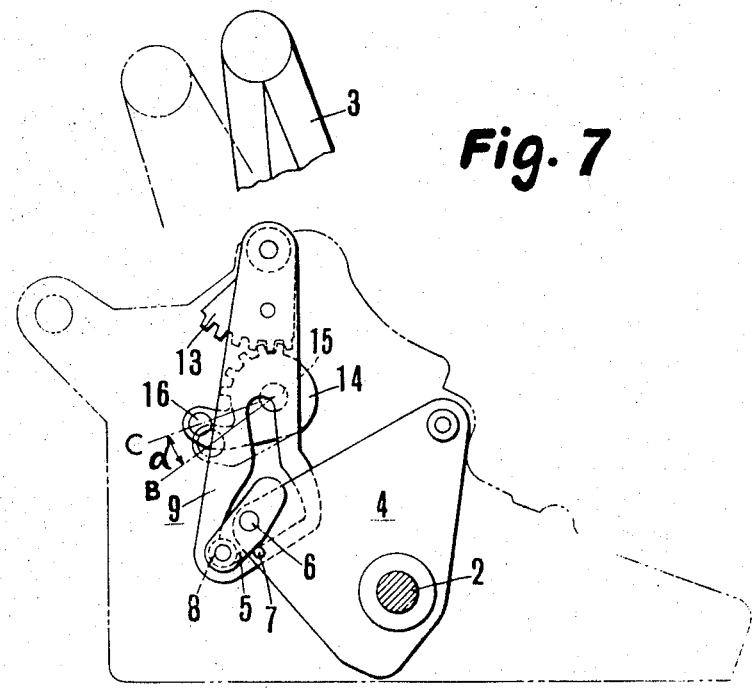
FIG. 7 is a view similar to FIG. 6 but showing the parts in a different operative relationship.

Referring to FIG. 7, as the operating lever 3 is rocked clockwise from the broken line position to the solid line position, the rock plate 4 is caused to move clockwise and the arm 5 is caused to be rocked in a counter-clockwise direction to the position where its lower edge abuts the pin 7 and is stopped thereby. It will be seen that the horizontal distance between the centers of pin 6 and roller 8 is reduced and, accordingly, the arm 9 is caused to be rocked in a counter-clockwise direction, as viewed in FIG. 7. Such movement will effect rocking of the pinion 14 in a clockwise direction through angle $a$ as defined by lines B and C drawn through the centers of shaft 15 and bail rod 16 and the bail rod will have moved from the broken line to the solid line position. In the position illustrated in FIG. 7 the roller 8 is received in the recess 12 of rock arm 9 and the bail rod 16 is momentarily held in such position.

Figure 3:
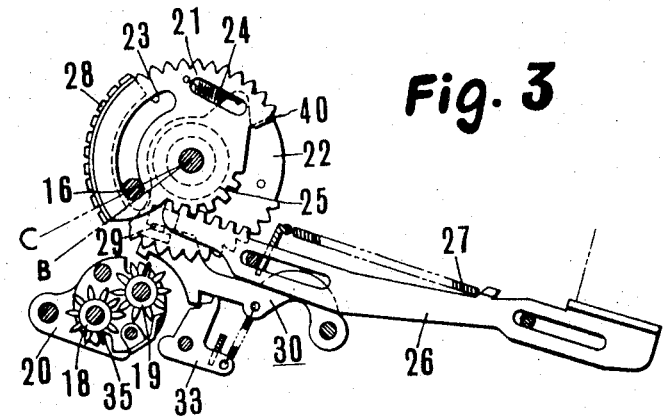

It will be understood that prior to the movement of bail rod 16 the pawl 30 and lug 29 are disposed in the relationship illustrated in FIGS. 3 and 5 which corresponds to a condition in which a tens transfer has been effected and the lug 29 is received within notch 30'. Before a subsequent operation may be performed, it is necessary to reset the transfer mechanism to the condition illustrated in FIG. 4. It will be noted that when the bail 16 is in the position illustrated in FIG. 3, the type segment 21 and sector gear 22 are in positions wherein the lug 40 is in abutment with the edge of the sector gear 22. Thus, as the bail rod 16 moves from line B to line C both type segment 21 and sector gear 22 are caused to rotate simultaneously with the lower edge of the arcuate slot 23 engaging the bail 16. In such movement the lug 29 is moved out of its receiving notch 30' and the comb plate 34 effects rocking of the latch 33 from the position illustrated in FIG. 5 to that illustrated in FIG. 4 wherein the lug 29 abuts the shoulder 30a of the transfer pawl 30. The accumulator transfer mechanism is now re-set and conditioned for the next operation.

As the operating lever 3 is rocked further in a forwardly direction, clockwise as in FIG. 7, the roller 8 rides along the arcuate edge 11 of the rock arm 9 to effect movement of the same and during this interval there is minimal movement of the rock arm 9, since the curvature of the arc portion 11 is such as to coincide substantially with the locus of roller 8 revolving around the axis of shaft 2. However, when the roller 8 is caused to enter into the slot portion 10 maximum rocking of the rock arm 9 in a counter-clockwise direction, as viewed in FIG. 8, is effected. The relationship assumed by the parts when the operating lever 3 has reached the end of its forward stroke is illustrated in FIG. 8. It will be understood that the end of the forward stroke of the operating lever 3, the bail rod 16 is in its uppermost position as illustrated in FIG. 8 and in such position the type segments 21 have been caused to be rotated to their maximum extent wherein the lowermost portion of the arcuate slots 23 engage the bail rod 16.

On the return stroke of the operating lever 3, the arm 5 is caused to be rocked clockwise, as viewed in FIG. 8, to the point where its left hand edge engages the pin 7. The arm 5 is now rigid with rock plate 4 and as the shaft 2 is caused to be returned to its non-operating position by a spring operatively connected to the lever 3 the roller 8 again enters into slot portion 10 and then rides on arcuate edge 11 until it returns to non-operative position in engagement with the recess 12.

In the modified embodiment illustrated in FIGS. 10 through 13 inclusive, a main shaft 102 is supported in frame members 101 and has an operating lever 103 fixed to one end thereof. A generally triangular operating plate 104, shaped substantially as shown, is fixed on shaft 102 and carries a roller 108 located at one corner thereof. A rock arm 109 is pivoted on shaft 110 supported in frame members 101 and is provided at its lower end with a cutout 107 shaped substantially as shown and defining camming surfaces. A segmental gear 113 is fixed to the rock arm 109 with its center coincident with the axis of shaft 110. A generally S-shaped lever 105 is pivoted as at 106 to the rock arm 109. A spring 111 connected between one end of the lever 105 and shaft 110 normally maintains the lever 105 in the position illustrated in FIG. 10 wherein the lower end of the lever intersects the cutout portion 107. A pin 117 fixed on the rock arm 109 limits the rotational movement of the lever 105 in a clockwise direction, as viewed in FIG. 10. A segmental pinion 112 is pivotally supported as at 115 and includes an integral arm 114 supporting at its end one end of a bail rod 116. The gear 112 is adapted to mesh with the gear 113. As was explained with respect to the first embodiment, the bail rod 116 extends through a series of arcuate slots formed in each of a plurality of type segments, not shown, the opposite end of the bail rod being suitably supported on an arm, not shown, which is pivotally supported on a shaft co-axial with shaft 115.

Figure 2:
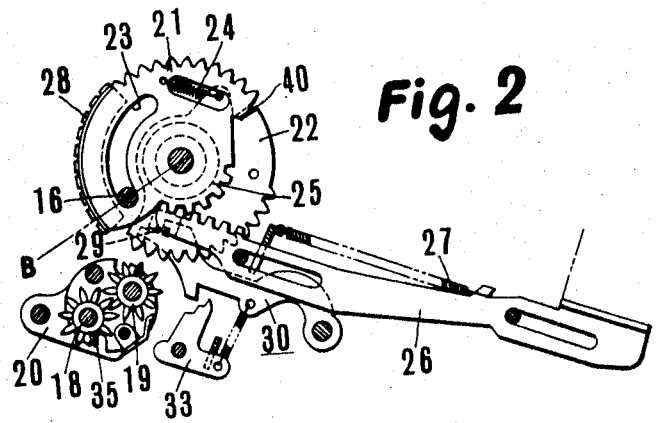
FIGS. 2 and 3 are similar views showing the parts in different operative relationships.
Figure 10:
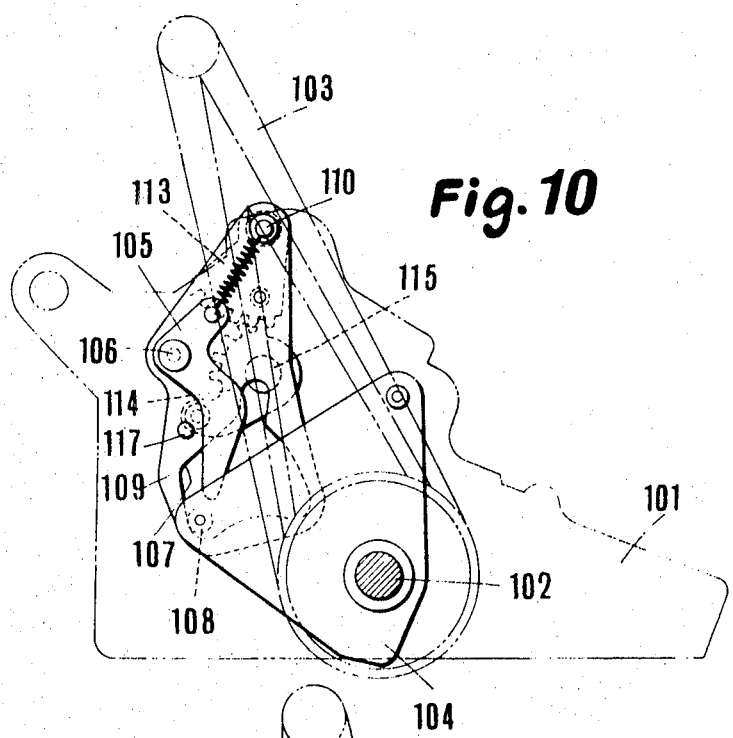
FIG. 10 is an elevational view, partly in cross-section, of a modified embodiment of our invention.
Figure 11:
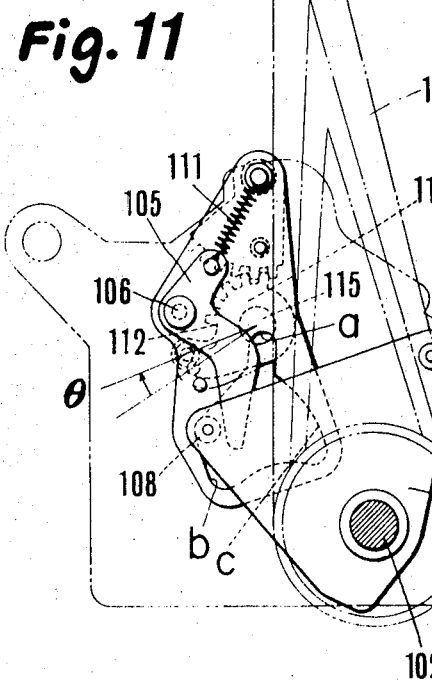
FIG. 11–13 are similar views showing the relationship assumed by the parts at different positions of the operating lever.

FIG. 10 illustrates the at rest position of the parts in which the roller 108 is disposed at the lower end of cam surface $b$ of cutout 107. It will be understood that the cam surfaces of rock arm 109 are constantly biased into engagement with roller 108 by reason of the tension of springs 27 (FIGS. 1, 2 and 3). When the rock plate 104 has been caused to move from the position illustrated in FIG. 10 to that illustrated in FIG. 11, the roller 108 has moved upwardly along cam surface *b* of the cut-out 107 and the rock arm 109 has been caused to rock in a counter-clockwise direction with the segmental gear 113 thereof transmitting rotational movement to the segmental pinion 112 and thereby moving the bail rod 116 through angle $\theta$. This corresponds to the same movement of the bail 16 as in the first described embodiment, with the related parts functioning, as hereinabove described. This movement of the bail rod 116 permits the type segments to rotate a distance equivalent to one numeral and thereby effect a re-setting of the accumulator transfer mechanism.

Figure 12:
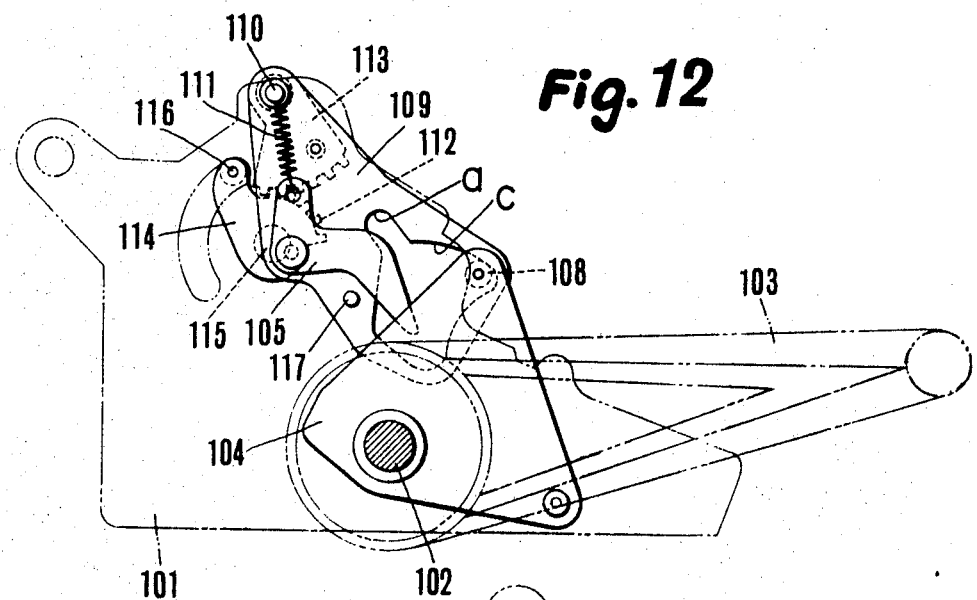
Figure 13:
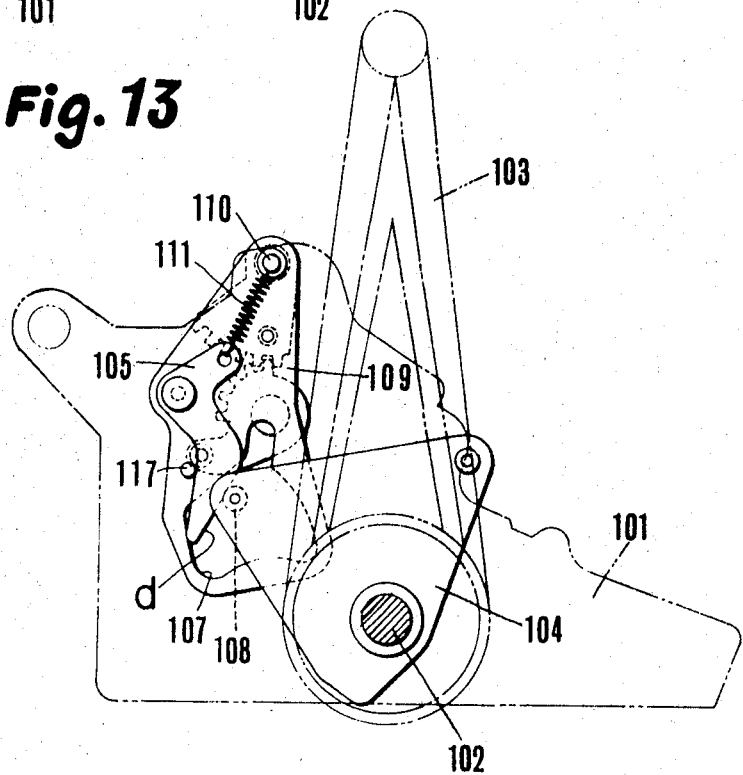

Upon further movement of the operating lever 103 in a clockwise direction, the roller 108 continues moving along the upper portion of cam portion *b* and since this portion is substantially identical in shape with the locus of movement of roller 108 around shaft 102, the rock arm 109 remains substantially stationary until roller 108 enters the slot portion *a* at which point the arm 109 is caused to swing counter-clockwise to the full limit of its movement, substantially to the position illustrated in FIG. 12. It will be understood that as the roller 108 is revolved in a clockwise direction, as viewed in FIG. 11, the lever 105 is caused to be rocked in a counter-clockwise direction against the tension of spring 111.

Continued movement of the lever 103 to the limit of its forward stroke, as illustrated in FIG. 12, will cause the roller 108 to engage the cam portion *c* of the cut-out 107 and, since this edge is curved to conform to the locus movement of roller 108, no further movement of the rock arm 109 will take place. It will be understood that the roller 108 will be clear of the lever 105 at the point where the roller 108 is in engagement with the cam portion *c*, the lower end of the arm 105 having wiped over the roller 108 and returned to its normal position.

Upon the return stroke of the operating lever 103, the roller 108 is caused to ride upwardly along cam portion *c* and then into recess *a* at which point the rock arm 109 is then caused to be rocked in a clockwise direction, thereby effecting movement of the segmental pinion 112 and bail rod 116 in a counter-clockwise direction. Further, during the return stroke of the operating lever 103, the roller 108 engages edge *d* of the lever 105. It will be noted that the lower part of lever 105 is now in engagement with stop 117. Accordingly, the rock arm 109 is thereby caused to be rocked in a clockwise direction which effects rocking of the segmental pinion 112 in a counter-clockwise direction to move the bail rod 116 to its non-operating position. After the roller 108 moves off of the edge *d* of the lever 105 it again engages the lower portion of cam portion *b* and assumes the relationship illustrated in FIG. 10 corresponding to its non-operating position.

It should be readily apparent that in each of the above described embodiments, the bail rod is moved an incremental distance equivalent to one numeral during the initial portion of the stroke of the operating lever so as to permit the type segments to rotate a corresponding distance and thereby reset the accumulator transfer mechanism for operation upon the following cycle.

Various changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:
1. In a calculating machine having a plurality of settable amount representing stops, actuators movable from their normal positions to engage the stops and to be differentially set thereby, toothed elements having lost motion connection with the actuators respectively permitting the toothed elements to move to the extent of one tooth thereof relative to their actuators, a restoring bail rod operated near the end of a machine cycle to restore the actuators to their normal positions, resilient means between the toothed elements and actuators to take up the lost motion, accumulator pinions respectively engageable with the toothed elements, transfer cams on the accumulator pinions, transfer pawls cooperable with the cams respectively and having parts engageable with the toothed elements respectively to arrest movement of the toothed elements and thereby to cause motion of the toothed elements with respect to their actuators as the actuators are restored to normal position by the restoring bail rod, a main shaft, means operated by the main shaft to cause engagement of the accumulator pinions with the toothed elements shortly after the commencement of a total taking operation cycle of the machine, the improvement which comprises means operatively connected to said restoring bail rod and said main shaft and effective prior to the engagement of the accumulator pinions with the toothed elements to move the restoring bail rod during the initial portion of an operating cycle in a direction whereby to permit said actuators and toothed elements to move a sufficient distance to permit resetting of their respective transfer pawls to normal position, said means including an operating plate fixed on said shaft, an arm pivoted on said operating plate and carrying a cam follower at one end thereof, a pivoted rock arm having a cut-out defining camming surfaces adapted to be engaged by said cam follower, and gear means operatively connecting said rock arm with said bail rod.

2. The invention as defined in claim 1 wherein the camming surfaces of said cut-out cooperate with said cam follower to control the movement of said rock arm to move said restoring bail rod.

3. The invention as defined in claim 1 wherein the impromevent means includes an operating plate fixed on said shaft, a cam follower carried on said operating plate, a pivoted rock arm having a cut-out defining camming surfaces adapted to be engaged by said cam follower and gear means operatively connecting said rock arm with said bail rod.

4. The invention as defined to claim 3 including a lever pivoted on said rock arm and having a portion extending into the path of movement of said cam follower, said lever being spring biased so as to be engaged by said cam follower to control the movement of said rock arm during a portion of the return movement of said shaft.

5. The invention as defined in claim 3 wherein the camming surfaces of said cut-out cooperate with said cam follower to control the movement of said rock arm.

References Cited
UNITED STATES PATENTS

| | | | |
|---|---|---|---|
| 2,411,050 | 11/1946 | Mehan | 235—60 |
| 2,429,522 | 10/1947 | Mehan et al. | 235—133 |
| 2,635,812 | 4/1953 | Mehan | 235—137 |
| 3,142,441 | 7/1964 | Edwards | 235—60 |

STEPHEN J. TOMSKY, Primary Examiner

U.S. Cl. X.R.

235—60